(12) United States Patent
Peng et al.

(10) Patent No.: US 12,632,432 B2
(45) Date of Patent: May 19, 2026

(54) GRAPH DATA PROCESSING METHODS AND SYSTEMS

(71) Applicant: Alipay (Hangzhou) Information Technology Co., Ltd., Hangzhou (CN)

(72) Inventors: Zhiwei Peng, Hangzhou (CN); Lun Gao, Hangzhou (CN); Zhenxuan Pan, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/468,363

(22) Filed: Sep. 15, 2023

(65) Prior Publication Data

US 2024/0095224 A1 Mar. 21, 2024

(30) Foreign Application Priority Data

Sep. 15, 2022 (CN) .......................... 202211123184.1

(51) Int. Cl.
*G06F 16/2458* (2019.01)
*G06F 16/22* (2019.01)
(52) U.S. Cl.
CPC ...... *G06F 16/2228* (2019.01); *G06F 16/2474* (2019.01)
(58) Field of Classification Search
CPC ... G06F 16/2228–2272; G06F 16/2474; G06F 16/901–9024
See application file for complete search history.

(56) References Cited

U.S. PATENT DOCUMENTS

2014/0280302 A1* 9/2014 Morsi ................. G06F 16/9024
                                                              707/769
2018/0075159 A1  3/2018 Lin et al.
2024/0004509 A1* 1/2024 Díaz López ........ G06F 16/2228

FOREIGN PATENT DOCUMENTS

CA            3150262 A1 *  3/2021  ......... G06F 16/9024
CN          113760971 A    12/2021
CN          114048849 A     2/2022
CN          114416891 A     4/2022
CN          114791968 A     7/2022
WO   WO-2018006073 A1 *  1/2018  ........... G06F 16/287

* cited by examiner

*Primary Examiner* — Robert W Beausoliel, Jr.
*Assistant Examiner* — Nirav K Khakhar
(74) *Attorney, Agent, or Firm* — Fish & Richardson P.C.

(57) ABSTRACT

Implementations of this specification provide graph data processing systems and methods. An example graph data processing system includes a data storage system and a graph computing engine. The data storage system is configured to store a plurality of pieces of graph data corresponding to a plurality of versions, where the plurality of pieces of graph data are generated based on a plurality of groups of service data generated by a target service system in a plurality of consecutive time intervals. The graph computing engine is configured to receive a graph feature computing request. The graph computing engine is further configured to search the plurality of pieces of graph data stored in the data storage system for a plurality of pieces of target graph data corresponding to the plurality of target versions, and compute graph features of the plurality of pieces of target graph data.

20 Claims, 2 Drawing Sheets

Graph feature
computing request

Graph feature of
target graph data

Graph computing
engine                    20

Target version        Target graph data

Data storage system        10

Graph data & versions

Service data

Sequence diagram
engine                    30

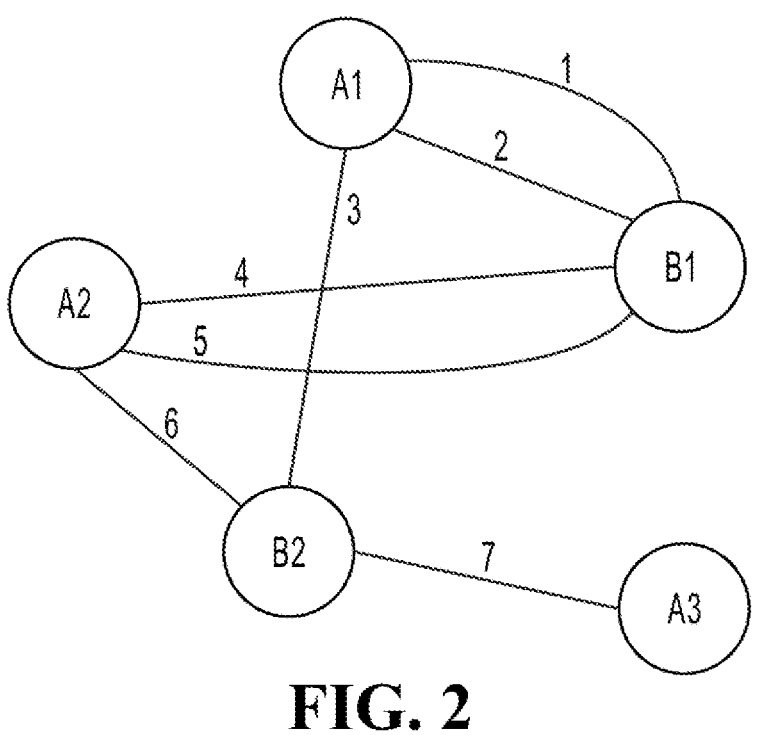

FIG. 2

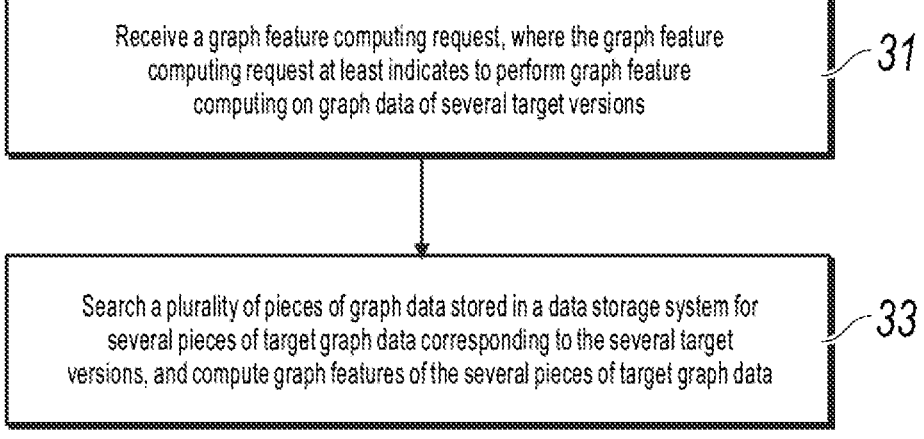

Receive a graph feature computing request, where the graph feature computing request at least indicates to perform graph feature computing on graph data of several target versions — 31

Search a plurality of pieces of graph data stored in a data storage system for several pieces of target graph data corresponding to the several target versions, and compute graph features of the several pieces of target graph data — 33

FIG. 3

GRAPH DATA PROCESSING METHODS AND SYSTEMS

CROSS-REFERENCE TO RELATED APPLICATIONS

This application claims priority to Chinese Patent Application No. 202211123184.1, filed on Sep. 15, 2022, which is hereby incorporated by reference in its entirety.

TECHNICAL FIELD

One or more embodiments of this specification relate to the computer field, and in particular, to graph data processing methods and systems.

BACKGROUND

A graph is a relatively typical nonlinear data, and includes several vertexes and edges for connecting the vertexes. Graph data are nonlinear data whose structure is similar to that of the graph, and mainly includes nodes, relationships, node attributes, relationship attributes, etc. The node in the graph data corresponds to the vertex in the graph, the relationship in the graph data corresponds to the edge in the graph, and the node attribute and the relationship attribute are data of a key-value pair type, and are used to describe the uniqueness of a relationship between nodes.

With the development of Internet information technologies, simple linear data are becoming increasingly difficult to satisfy increasingly complex service needs in various technical scenarios. For example, in technical scenarios such as data security, risk control, and advertising, graph features of nonlinear data such as graph data may need to be computed, and a prediction service is performed based on the computed graph features.

SUMMARY

One or more embodiments of this specification provide graph data processing methods and systems.

According to a first aspect, a graph data processing system is provided, including a data storage system and a graph computing engine. The data storage system is configured to store a plurality of pieces of graph data corresponding to a plurality of versions, where the plurality of pieces of graph data are generated based on a plurality of groups of service data generated by a target service system in a plurality of consecutive time intervals. The graph computing engine is configured to receive a graph feature computing request, where the graph feature computing request at least indicates to perform graph feature computing on graph data of several target versions; and search the plurality of pieces of graph data stored in the data storage system for several pieces of target graph data corresponding to the several target versions, and compute graph features of the several pieces of target graph data.

In a possible implementation, the graph feature computing request further indicates graph feature computing logic, and the graph computing engine is specifically configured to compute the graph features of the several pieces of target graph data based on the graph feature computing logic.

In a possible implementation, the graph data processing system further includes a sequence diagram engine, configured to: in response to the end of a current time interval, generate graph data based on service data generated by the target service system in the current time interval, determine a version corresponding to the graph data, and store the graph data in the data storage system based on the version corresponding to the graph data.

In a possible implementation, the graph data processing system further includes a sequence diagram engine, configured to receive service data generated by the target service system in at least two consecutive time intervals; and for each time interval, generate graph data based on service data generated by the target service system in the time interval, determine a version corresponding to the graph data, and store the graph data in the data storage system based on the version corresponding to the graph data.

In a possible implementation, the data storage system is a graph database.

In a possible implementation, a type of the graph feature is a node-level feature, a hierarchical feature, or a neighborhood overlapping feature.

In a possible implementation, the service data include at least two entities used as nodes of graph data and node attributes respectively corresponding to the at least two entities.

In a possible implementation, the graph features of the several pieces of target graph data are used to support a target neural network model in performing a time sequence prediction service.

According to a second aspect, a graph data processing method is provided, and relates to a data storage system. The data storage system stores a plurality of pieces of graph data corresponding to a plurality of versions, and the plurality of pieces of graph data are generated based on a plurality of groups of service data generated by a target service system in a plurality of consecutive time intervals. The method includes the following: a graph feature computing request is received, where the graph feature computing request at least indicates to perform graph feature computing on graph data of several target versions; and the plurality of pieces of graph data stored in the data storage system are searched for several pieces of target graph data corresponding to the several target versions, and graph features of the several pieces of target graph data are computed.

In a possible implementation, the graph feature computing request further indicates graph feature computing logic, and that graph features of the several pieces of target graph data are computed specifically includes the following: the graph features of the several pieces of target graph data are computed based on the graph feature computing logic.

In a possible implementation, the method further includes: in response to the end of a current time interval, graph data are generated based on service data generated by the target service system in the current time interval, a version corresponding to the graph data is determined, and the graph data are stored in the data storage system based on the version corresponding to the graph data.

In a possible implementation, the method further includes: service data generated by the target service system in at least two consecutive time intervals are received; and for each time interval, graph data are generated based on service data generated by the target service system in the time interval, a version corresponding to the graph data is determined, and the graph data are stored in the data storage system based on the version corresponding to the graph data.

In a possible implementation, the data storage system is a graph database.

In a possible implementation, a type of the graph feature is a node-level feature, a hierarchical feature, or a neighborhood overlapping feature.

In a possible implementation, a single piece of service data includes at least two entities that are to be used as nodes of graph data and node attributes respectively corresponding to the at least two entities.

In a possible implementation, the graph features of the several pieces of target graph data are used to support a target neural network model in performing a time sequence prediction service.

According to a third aspect, a computer-readable storage medium is provided. The computer-readable storage medium stores a computer program/instructions, and when the computer program/instructions are executed in a computing device, the computing device performs the method according to any one of the implementations of the second aspect.

According to a fourth aspect, a computing device is provided, including a memory and a processor. The memory stores a computer program/instructions, and when executing the computer program/instructions, the processor implements the method according to any one of the implementations of the second aspect.

According to the methods and the systems provided in the one or more embodiments of this specification, a plurality of pieces of graph data are generated based on a plurality of groups of service data generated by a target service system in several consecutive time intervals, a plurality of versions are correspondingly configured for the plurality of pieces of graph data, and the plurality of pieces of graph data are stored in a data storage system based on the versions respectively corresponding to the plurality of pieces of graph data. On this basis, the data storage system can be searched based on several external target versions, and graph features of several pieces of target graph data involved in the target service system can be computed. As such, large-scale graph data involved in the target service system can be managed, the large-scale graph data involved in the target service system can be efficiently searched based on service needs, and a graph feature of related target graph data can be computed.

BRIEF DESCRIPTION OF DRAWINGS

To describe the technical solutions in the embodiments of this specification more clearly, the following briefly describes the accompanying drawings needed for describing the embodiments. Clearly, the accompanying drawings in the following descriptions show some embodiments of this application, and a person of ordinary skill in the art can still derive other accompanying drawings from these accompanying drawings without creative efforts.

FIG. 2 is an example schematic diagram illustrating graph data, according to one or more embodiments of this specification; and FIG. 3 is a flowchart illustrating a graph data processing method, according to one or more embodiments of this specification.

DESCRIPTION OF EMBODIMENTS

Figure 1:
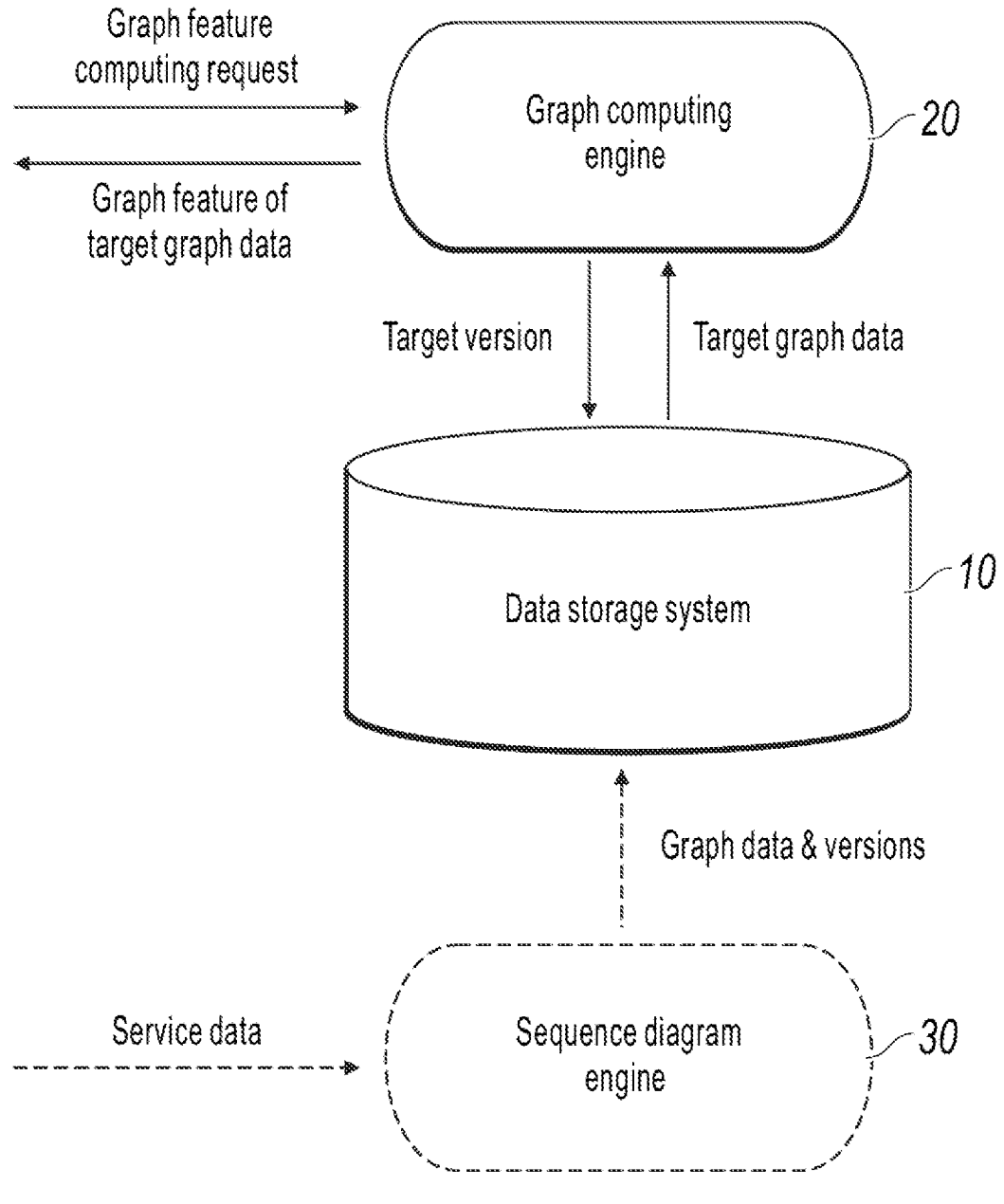
FIG. 1 is a schematic diagram illustrating a graph data processing system, according to one or more embodiments of this specification.

The following describes in detail the non-limiting embodiments provided in this specification with reference to the accompanying drawings.

Simple linear data are becoming increasingly difficult to satisfy increasingly complex service needs in various technical scenarios. For example, in technical scenarios such as data security, risk control, and advertising, graph features of nonlinear data such as graph data may need to be used for a prediction service as needed. Specifically, a service system in the previous various technical scenarios may involve large-scale graph data. For example, a plurality of pieces of graph data need to be correspondingly generated based on a plurality of groups of service data respectively generated by the service system in a plurality of consecutive time intervals, then graph features of the plurality of pieces of graph data are computed, and a prediction service is performed by using the graph features of the plurality of pieces of graph data. The previous service system can be, for example, a product transaction system, an employee information management system, or an advertising system.

At present, there is no better solution to manage large-scale graph data involved in a single service system. Therefore, it is difficult to search the large-scale graph data involved in the service system based on a service need and to compute a graph feature of related graph data.

To solve the previous problems, embodiments of this specification provide at least graph data processing methods and systems, to generate a plurality of pieces of graph data based on a plurality of groups of service data generated by a target service system in several consecutive time intervals, correspondingly configure a plurality of versions for the plurality of pieces of graph data, and store the plurality of pieces of graph data in a data storage system based on the versions respectively corresponding to the plurality of pieces of graph data. On this basis, the data storage system can be searched based on several external target versions, and graph features of several pieces of target graph data involved in the target service system can be computed. As such, large-scale graph data involved in the target service system can be managed, the large-scale graph data involved in the target service system can be efficiently searched based on a service need, and graph features of several pieces of target graph data can be computed.

FIG. 1 is a schematic diagram illustrating a graph data processing system, according to one or more embodiments of this specification. As shown in FIG. 1, the graph data processing system includes at least a data storage system 10 and a graph computing engine 20, and can further include a sequence diagram engine 30.

The sequence diagram engine 30 can be configured to receive, in real time or approximately in real time, service data generated by a target service system in a current time interval, and in response to the end of the current time interval, generate graph data corresponding to the current time interval based on the service data generated by the target service system in the current time interval, determine a version corresponding to the graph data, and then store the graph data in the data storage system 10 based on the version corresponding to the graph data.

The service data include at least two entities that are to be used as nodes in the graph data, and can further include or indicate respective node attributes of the at least two entities and a relationship attribute between every two of the at least two entities.

In an example that the target service system is a product transaction system, any product seller and product buyer can correspondingly generate one piece of transaction data in the product transaction system based on each transaction occurring in the product transaction system. In this case, the previous service data are transaction data generated by the product transaction system. A single piece of transaction data can include but is not limited to all or some of the following information: a product buyer, a product seller, a sales amount, and transaction time. Both the product buyer and the product seller are entities that are to be used as nodes in the graph data. Node attributes need to be used to indicate that the nodes are the product buyer and the product seller. At least one of the sales amount or the transaction time may be used as a relationship attribute of the nodes.

For example, references can be made to a plurality of pieces of transaction data generated by the product transaction system provided in the following Table 1 as examples.

TABLE 1

| Identifier | Transaction time | product buyer | product seller | Sales amount |
|---|---|---|---|---|
| 0 | T0 | A1 | B1 | X0 |
| 1 | T1 | A1 | B1 | X1 |
| 2 | T2 | A1 | B1 | X2 |
| 3 | T3 | A1 | B2 | X3 |
| 4 | T4 | A2 | B1 | X4 |
| 5 | T5 | A2 | B1 | X5 |
| 6 | T6 | A2 | B2 | X6 |
| 7 | T7 | A3 | B2 | X7 |
| 8 | T8 | A1 | B1 | X8 |
| 9 | T9 | A2 | B2 | X9 |

Referring to Table 1, assume that the product transaction system sequentially generates ten pieces of transaction data whose identifiers are 0 to 9, and the sequence diagram engine 30 can receive, in real time, transaction data generated by the product transaction system. Further assume that transaction time TO is located before a start moment of the $T^{th}$ time interval, transaction time T1 is located after the start moment of the Tt h time interval, transaction time T7 is located before finish time of the $T^{th}$ time interval, and transaction time T8 is located after the finish time of the $T^{th}$ time interval. In this case, when a current moment is the finish time of the $T^{th}$ time interval, the sequence diagram engine 30 receives a total of seven pieces of transaction data whose identifiers are sequentially 1 to 7 and that are generated by the product transaction system in the $T^{th}$ time interval. In this case, the sequence diagram engine 30 can generate, for example, graph data shown in FIG. 2 based on the seven pieces of transaction data.

As shown in FIG. 2, entities such as product buyers A1, A2, A3 and product sellers B1 and B2 included in the previous seven pieces of transaction data are used as nodes in the generated graph data. Seven edges whose numbers are sequentially 1 to 7 and that are used for connecting the nodes correspond to the seven pieces of transaction data whose identifiers are sequentially 1 to 7, in other words, a relationship represented by one edge in FIG. 2 is one transaction behavior between connected nodes. In addition, for a node attribute corresponding to a certain node in FIG. 2, the node attribute can indicate that the node is a product seller or a product buyer. For a relationship attribute of a certain edge/a relationship attribute between two nodes connected by a certain edge in FIG. 2, the relationship attribute can include at least one of transaction time or a transaction amount in transaction data corresponding to the edge.

The sequence diagram engine 30 can receive, at a time, all service data generated by the target service system in at least two consecutive time intervals. On this basis, the sequence diagram engine 30 can generate, for each of the at least two time intervals, graph data corresponding to the time interval based on service data generated by the target service system in the time interval, determine a version corresponding to the graph data, and then store the graph data in the data storage system 30 based on the version corresponding to the graph data.

A single piece of service data can include generation time of the piece of service data, so that the sequence diagram engine 30 can classify a plurality of pieces of service data received by the sequence diagram engine 30 to obtain at least two groups of service data corresponding to the at least two time intervals. In other words, the sequence diagram engine 30 can determine a time interval that each of the plurality of pieces of service data belongs to in the at least two time intervals based on generation time included in each of the plurality of pieces of service data.

Referring back to Table 1, transaction time in a single piece of transaction data is generation time of the transaction data. For example, a user can obtain, from the product transaction system through offline processing, the ten pieces of transaction data generated by the product transaction system in the $(T-1)^{th}$ time interval, the Tt h time interval, and the $(T+1)^{th}$ time interval shown in Table 1, and provide the ten pieces of transaction data shown in Table 1 to the sequence diagram engine 30 at a time. For example, the sequence diagram engine 30 can classify, based on transaction time respectively included in the previous ten pieces of transaction data, transaction data whose identifier is 0 into a data group corresponding to the $(T-1)^{th}$ time interval, classify transaction data whose identifiers are sequentially 1 to 7 into a data group corresponding to the $T^{th}$ time interval, and classify transaction data whose identifiers are sequentially 8 and 9 into a data group corresponding to the $(T+1)^{th}$ time interval. Further, the sequence diagram engine 30 generates, for the data groups respectively corresponding to the $(T-1)^{th}$ time interval, the $T^{th}$ time interval, and the $(T+1)^{th}$ time interval, graph data respectively corresponding to the three time intervals by using a method similar to the previously described method.

It is worthwhile to note that for a version of graph data, it only needs to be ensured that a plurality of pieces of graph data involved in a same service system respectively correspond to different versions. For example, identifier T of the $T^{th}$ time interval can be used as a version of graph data corresponding to the $T^{th}$ time interval. In addition, graph data and a version corresponding to the graph data can be associatively stored in the data storage system 10, and an identifier of a target service system can be stored in the data storage system 10 associatively with graph data involved in the target service system.

It is worthwhile to note that a method other than the method of the sequence diagram engine 30 may be used to obtain a plurality of groups of service data generated by the target service system in a plurality of consecutive time intervals, generate a plurality of pieces of graph data corresponding to a plurality of versions based on the plurality of groups of service data, and store the plurality of pieces of graph data in the data storage system 10 based on the versions respectively corresponding to the plurality of pieces of graph data.

For example, the previous data storage system 10 can be a graph database, or can be any possible relational database.

The graph computing engine 20 can receive a graph feature computing request initiated by the user by using a terminal or another service system. The graph feature computing request at least indicates to perform graph feature computing on graph data of several target versions. Further, the graph computing engine 20 can search, for several pieces of target graph data corresponding to the several target versions, the plurality of pieces of graph data that are stored in the data storage system 10, are involved in the target service system and correspond to the plurality of versions, and compute graph features of the several pieces of target graph data.

The graph features of the several pieces of target graph data can be respective graph features of the several pieces of target graph data. In this case, for any piece of graph data, graph features of the graph data can be usually classified into three main types: a node-level feature, a hierarchical feature, and a neighborhood overlapping feature. The node-level feature includes, for example, a plurality of graph features such as a degree of a node, feature vector centrality, and a clustering coefficient. The hierarchical feature mainly includes a plurality of graph features such as an adjacency matrix, a Laplacian matrix, and node measures. The neighborhood overlapping feature includes, for example, a plurality of graph features such as local overlap measures/regional overlapping, and global overlap measures/global overlapping. In addition to various typical graph features in the previous example, the graph feature can alternatively be another feature defined/customized by the user by using the graph computing engine 20.

In a possible implementation, the graph feature computing request can further indicate graph feature computing logic, so that the graph computing engine 20 computes the graph features of the several pieces of target graph data based on the graph feature computing logic. For example, if the graph feature computing logic can indicate that the graph features that need to be computed are a sequence obtained by arranging respective adjacency matrices of the several pieces of target graph data based on an order of versions, the graph computing engine 20 computes the adjacency matrices of the several pieces of target graph data based on the graph feature computing logic, and arranges the adjacency matrices based on the order of versions. For another example, if the graph feature computing logic can indicate that the graph features that need to be computed are respective node degrees of the several pieces of target graph data that are arranged based on an order of versions, and indicate that a node whose degree needs to be computed is a specific node, the graph computing engine 20 computes, based on the graph feature computing logic, degrees of the specific node that may be included in the several pieces of target graph data, and arranges the degrees of the specific node based on the order of versions.

It is worthwhile to specially note that when the data storage system 10 is configured to store large-scale graph data respectively involved in a plurality of service systems, the graph feature computing request can further include an identifier of the target service system, so that the graph computing engine searches large-scale graph data involved in the target service system for corresponding target graph data based on the identifier of the target service system.

The graph features of the several pieces of target graph data that are computed by the graph computing engine 20 can be usually used to support a pre-trained target neural network model in performing a prediction service, for example, used to support a corresponding time sequence prediction model in performing a time sequence prediction service. Continuing with the example that the target service system is a product transaction system, assuming that time intervals corresponding to the several pieces of target graph data are consecutive, and computed graph features are degrees of a specific node that are arranged based on an order of versions, referring back to the graph data shown in FIG. 2, it is not difficult to know that the graph features of the several pieces of target graph data essentially indicate a quantity of product sellers that a specific product buyer respectively purchases products from in several consecutive time intervals, or indicate a quantity of product buyers that a specific product seller respectively sells products to in a plurality of consecutive time intervals. Further, the graph features of the several pieces of target graph data can be input to a pre-trained time sequence prediction model, so that the time sequence prediction model predicts and outputs a quantity of product buyers that a specific product seller will respectively sell products to in several consecutive time intervals in the future, or predicts and outputs a quantity of product sellers that a specific product buyer will respectively purchase products from in several consecutive time intervals in the future. The prediction result can be further used to perform another decision-making service. For example, a location of a store address corresponding to a specific product seller on a store display page is determined based on the prediction result, or frequency of pushing product advertisement information to a specific product buyer is determined based on the prediction result.

Based on the same concept as the previous system embodiment, one or more embodiments of this specification further provide a graph data processing method. The method relates to a data storage system. The data storage system stores a plurality of pieces of graph data corresponding to a plurality of versions, and the plurality of pieces of graph data are generated based on a plurality of groups of service data generated by a target service system in a plurality of consecutive time intervals. As shown in FIG. 3, the method can include the following step 31 and step 33.

Step 31: Receive a graph feature computing request, where the graph feature computing request at least indicates to perform graph feature computing on graph data of several target versions.

Step 33: Search the plurality of pieces of graph data stored in the data storage system for several pieces of target graph data corresponding to the several target versions, and compute graph features of the several pieces of target graph data.

A person skilled in the art should be aware that in the previous one or more examples, functions described in this specification can be implemented by hardware, software, firmware, or any combination thereof. When the functions are implemented by software, computer programs corresponding to these functions can be stored in a computer-readable medium or transmitted as one or more instructions/code in the computer-readable medium, so that when the computer programs corresponding to these functions are executed by a computer, the method in any one of the embodiments of this specification is implemented by the computer.

One or more embodiments of the specification further provide a computer-readable storage medium. The computer-readable storage medium stores a computer program, and when the computer program is executed in a computing device, the computing device performs the graph data processing method provided in any one of the embodiments of this specification.

One or more embodiments of the specification further provide a computing device, including a memory and a processor. The memory stores executable code, and when executing the executable code, the processor implements the graph data processing method provided in any one of the embodiments of this specification.

The embodiments in this specification are described in a progressive way. For same or similar parts of the embodiments, mutual references can be made to the embodiments.

Each embodiment focuses on a difference from other embodiments. In particular, the apparatus embodiments are basically similar to the method embodiments, and therefore are described briefly. For related parts, references can be made to related descriptions in the method embodiments.

Specific embodiments of this specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and concurrent processing is feasible or can be advantageous.

The objectives, technical solutions, and beneficial effects of this application are further described in detail in the previous specific implementations. It should be understood that the previous descriptions are only specific implementations of this application and are not intended to limit the protection scope of this application. Any modification, equivalent replacement, improvement, etc. made based on the technical solutions of this application should fall within the protection scope of this application.

The invention claimed is:

1. A graph data processing system, comprising a data storage system and one or more processors, wherein the one or more processors are configured to:

receive a plurality of pieces of service data each from one of a plurality of service systems, wherein each of the plurality of pieces of service data comprises a generation time;

group the plurality of pieces of service data based on their generation times, wherein pieces of service data that belong to a same group are generated during a same time interval;

generate a piece of graph data for each group of service data, wherein a version of the piece of graph data is determined based on a time interval in which a corresponding group of service data are generated;

store, in the data storage system, a plurality of pieces of graph data corresponding to a plurality of versions and identifiers of each of the plurality of service systems;

receive a graph feature computing request comprising an identifier of a target service system, wherein the graph feature computing request indicates to perform graph feature computing on more than one piece of graph data of more than one target version selected from the plurality of versions;

search the data storage system for the more than one piece of graph data;

compute graph features of the more than one piece of graph data based on an order of the more than one target version;

input the computed graph features into a target neural network model trained to perform a time sequence prediction service; and output, from the target neural network model, a prediction result based on the time sequence prediction service, wherein the prediction result predicts one or more future values associated with the target service system in one or more future time intervals.

2. The graph data processing system according to claim 1, wherein the graph feature computing request further indicates graph feature computing logic, and the one or more processors are configured to compute the graph features of the more than one piece of graph data based on the graph feature computing logic.

3. The graph data processing system according to claim 1, wherein the one or more processors are further configured to:

in response to an end of a current time interval, generate a piece of graph data based on pieces of service data that are generated by a service system in the current time interval;

determine a version corresponding to the piece of graph data, wherein the version is determined based on the current time interval; and store the piece of graph data in the data storage system based on the version corresponding to the piece of graph data.

4. The graph data processing system according to claim 1, wherein the one or more processors are further configures to:

receive service data generated by the target service system in at least two consecutive time intervals;

for each time interval, generate a piece of graph data based on service data generated by the target service system in the time interval;

determine a version corresponding to the piece of graph data, wherein the version is determined based on a corresponding time interval; and store the graph data in the data storage system based on the version corresponding to the piece of graph data.

5. The graph data processing system according to claim 1, wherein the data storage system is a graph database.

6. The graph data processing system according to claim 1, wherein a type of the graph features is one of a node-level feature, a hierarchical feature, or a neighborhood overlapping feature.

7. The graph data processing system according to claim 1, wherein the service data comprise at least two entities used as nodes of graph data and node attributes.

8. The graph data processing system according to claim 1, wherein the graph features of the more than one piece of graph data are used to support the target neural network model in performing the time sequence prediction service.

9. A graph data processing method, comprising:

receiving a plurality of pieces of service data each from one of a plurality of service systems, wherein each of the plurality of pieces of service data comprises a generation time;

grouping the plurality of pieces of service data based on their generation times, wherein pieces of service data that belong to a same group are generated during a same time interval;

generating a piece of graph data for each group of service data, wherein a version of the piece of graph data is determined based on a time interval in which a corresponding group of service data are generated;

storing, in a data storage system, a plurality of pieces of graph data corresponding to a plurality of versions and identifiers of each of the plurality of service systems;

receiving a graph feature computing request comprising an identifier of a target service system, wherein the graph feature computing request indicates to perform graph feature computing on more than one piece of graph data of more than one target version selected from the plurality of versions;

searching the data storage system for the more than one piece of graph data;

computing graph features of the more than one piece of graph data based on an order of the more than one target version;

inputting the computed graph features into a target neural network model trained to perform a time sequence prediction service; and outputting, from the target neural network model, a prediction result based on the time sequence prediction service, wherein the prediction result predicts one or more future values associated with the target service system in one or more future time intervals.

10. The method according to claim 9, wherein the graph feature computing request further indicates graph feature computing logic, and wherein computing graph features of the more than one piece of graph data comprises:

computing the graph features of the more than one piece of graph data based on the graph feature computing logic.

11. The method according to claim 9, wherein the method further comprises:

in response to an end of a current time interval, generating a piece of graph data based on pieces of service data that are generated by the target service system in the current time interval;

determining a version corresponding to the piece of graph data, wherein the version is determined based on the current time interval; and storing the piece of graph data in the data storage system based on the version corresponding to the piece of graph data.

12. The method according to claim 9, wherein the method further comprises:

receiving service data generated by the target service system in at least two consecutive time intervals; and for each time interval, generating a piece of graph data based on service data generated by the target service system in the time interval;

determining a version corresponding to the piece of graph data, wherein the version is determined based on a corresponding time interval; and storing the graph data in the data storage system based on the version corresponding to the piece of graph data.

13. The method according to claim 9, wherein the data storage system is a graph database.

14. The method according to claim 9, wherein a type of the graph feature is one of a node-level feature, a hierarchical feature, or a neighborhood overlapping feature.

15. The method according to claim 9, wherein the service data comprise at least two entities used as nodes of graph data and node attributes.

16. The method according to claim 9, wherein the graph features of the plurality of pieces of target graph data are used to support the target neural network model in performing the time sequence prediction service.

17. A non-transitory computer-readable storage medium, wherein the non-transitory computer-readable storage medium stores programming instructions for execution by a computer system to perform operations comprising:

receiving a plurality of pieces of service data each from one of a plurality of service systems, wherein each of the plurality of pieces of service data comprises a generation time;

grouping the plurality of pieces of service data based on their generation times, wherein pieces of service data that belong to a same group are generated during a same time interval;

generating a piece of graph data for each group of service data, wherein a version of the piece of graph data is determined based on a time interval in which a corresponding group of service data are generated;

storing, in a data storage system, a plurality of pieces of graph data corresponding to a plurality of versions and identifiers of each of the plurality of service systems;

receiving a graph feature computing request comprising an identifier of a target service system, wherein the graph feature computing request indicates to perform graph feature computing on more than one piece of graph data of more than one target version selected from the plurality of versions;

searching the data storage system for the more than one piece of graph data;

computing graph features of the more than one piece of graph data based on an order of the more than one target version;

inputting the computed graph features into a target neural network model trained to perform a time sequence prediction service; and outputting, from the target neural network model, a prediction result based on the time sequence prediction service, wherein the prediction result predicts one or more future values associated with the target service system in one or more future time intervals.

18. The non-transitory computer-readable storage medium according to claim 17, wherein the graph feature computing request further indicates graph feature computing logic, and wherein computing graph features of the more than one piece of graph data comprises:

computing the graph features of the more than one piece of graph data based on the graph feature computing logic.

19. The non-transitory computer-readable storage medium according to claim 17, wherein the operations further comprises:

in response to an end of a current time interval, generating a piece of graph data based on pieces of service data that are generated by the target service system in the current time interval;

determining a version corresponding to the piece of graph data, wherein the version is determined based on the current time interval; and storing the piece of graph data in the data storage system based on the version corresponding to the piece of graph data.

20. The non-transitory computer-readable storage medium according to claim 17, wherein the operations further comprises:

receiving service data generated by the target service system in at least two consecutive time intervals; and for each time interval, generating a piece of graph data based on service data generated by the target service system in the time interval;

determining a version corresponding to the piece of graph data, wherein the version is determined based on a corresponding time interval; and storing the graph data in the data storage system based on the version corresponding to the piece of graph data.

* * * * *